Dec. 17, 1968  R. A. HINTON  3,417,070
POLYMERIZATION PROCESS USING A MULTIFEED CATALYST IN ORDER
TO CREATE A MORE ACTIVE CATALYTIC SPECIES
Filed Dec. 10, 1964
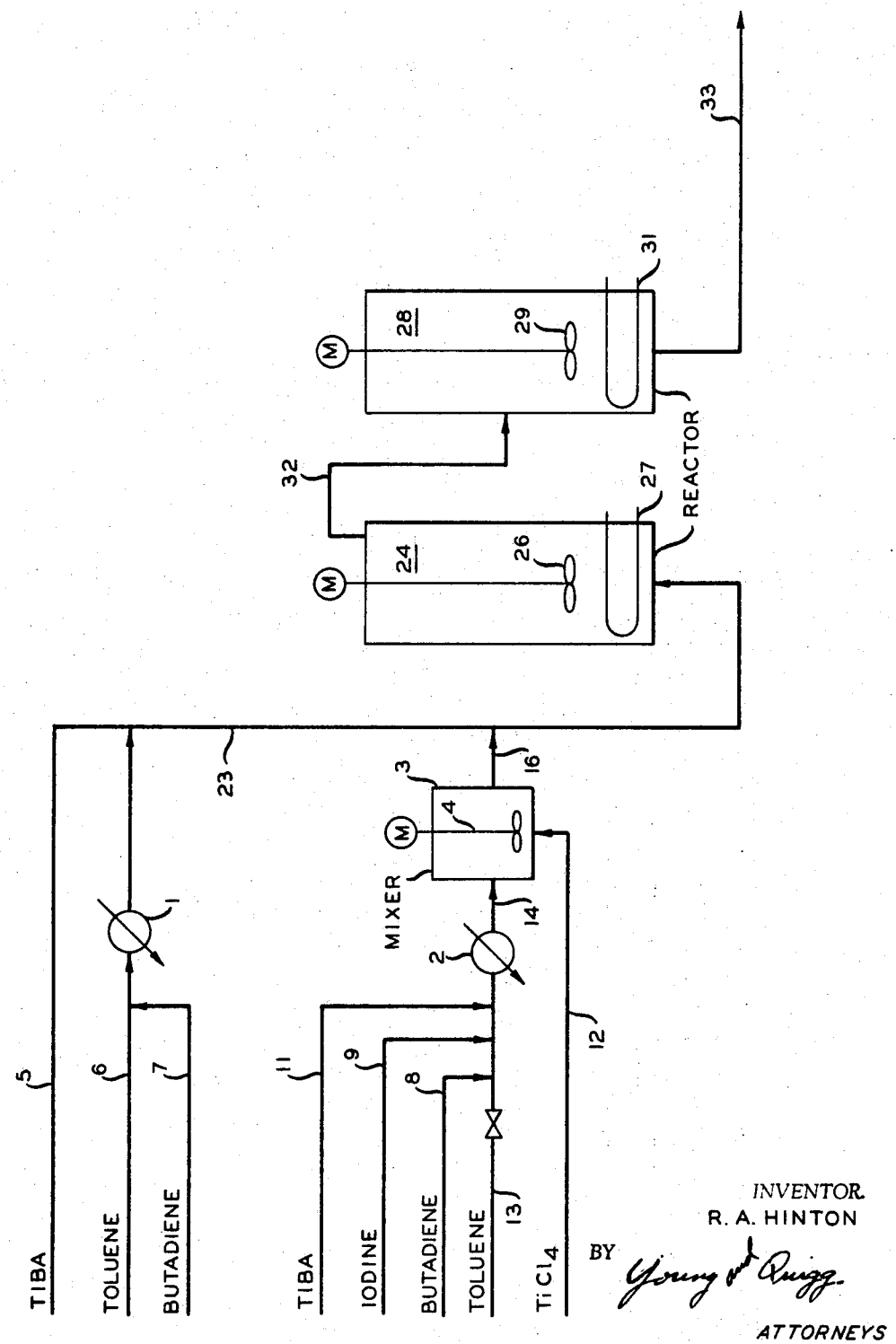
INVENTOR.
R. A. HINTON
BY
ATTORNEYS United States Patent Office 3,417,070
Patented Dec. 17, 1968

3,417,070
POLYMERIZATION PROCESS USING A MULTI-FEED CATALYST IN ORDER TO CREATE A MORE ACTIVE CATALYTIC SPECIES
Robert A. Hinton, Bartlesville, Okla., assignor to Phillips Petroleum Company, a corporation of Delaware
Filed Dec. 10, 1964, Ser. No. 417,411
5 Claims. (Cl. 260—94.3)

ABSTRACT OF THE DISCLOSURE

In a continuous process for polymerizing a conjugated diene with a catalyst which forms on mixing (a) an organometal compound, (b) a titanium halide, and (c) at least one component selected from the group consisting of iodine, 1,4-diiodo-2-butene and the monomethyl and dimethyl homologs thereof, all the recycle hydrocarbon diluent, most of the conjugated diene, and a substantial portion of the compound of Group (a) are mixed to provide a first stream; the remainder of the conjugated diene, the remainder of the compound of Group (a) and all of the compound of Group (c) are mixed to provide a second stream; this second stream is mixed with a stream carrying the titanium halide to provide a third stream; the first and third streams are then mixed to provide a fourth stream which carries the catalyst, reactants, and diluent into a reaction zone before there has been any substanial formation of polymer in any of the streams.

---

This invention relates to a polymerization process. In one aspect, the invention relates to a method of feeding ingredients to a polymerization zone. In another aspect, it relates to a process for polymerizing 1,3-butadiene so as to obtain a high cis-1,4-polybutadiene.

Recent discoveries in the field of diene polymerization relating to the formation of polymers of controlled configuration has aroused considerable interest. The polymerization involves the use of so-called stereospecific catalysts or initiators. Many of the products have outstanding physical properties which render them superior to products heretofore available.

For substantially all commercial polymerization processes, recycle of the polymerization zone diluent is an economic necessity. However, in use, the diluent generally becomes contaminated and purification is necessary. Even with conventional purification, impurities may be returned to the system which interfere with catalyst formation and/or polymerization. This can result in uneven, usually undesirably low, conversion in the first step of a reaction zone comprising a series of separate vessels. This, in turn, leads to excessively high conversion in subsequent stage. Poor temperature control can result because of varying heat loads on the system.

An object of this invention is to provide an improved process for the production of polymers of conjugated dienes. A further object of the invention is to provide a new and improved method of introducing the various ingredients to a polymerization zone. A further object is to provide an improved process for producing polybutadiene containing between 85 and 100 percent cis 1,4- addition.

Other objects and advantages of this invention will become apparent to one skilled in the art upon consideration of the accompanying disclosure which includes A drawing showing in schematic form a system adapted to practice this invention.

Broadly, the invention resides in a continuous process in which a conjugated diene containing from 4 to 5 carbon atoms is polymerized in a polymerization zone in the presence of a hydrocarbon diluent, substantially all of the diluent being recycled to the process, with a catalyst which forms on mixing (a) an organometal compound selected from the group consisting of compounds having the formula $R_nM$ and compounds having the formula $R_2AlH$, wherein R is selected from the group consisting of alkyl, cycloalkyl, aryl, and combinations of these radicals, M is selected from the group consisting of magnesium and aluminum, and $n$ is an integer equal to the valence of the metal M, (b) a titanium halide having the formula $TiX_y$, wherein X is selected from the group consisting of chlorine and bromine, and $y$ is an integer from 2 to 4, and (c) at least one component selected from the group consisting of iodine, 1,4-diiodo-2-butene and the monomethyl and the dimethyl homologs thereof, the improvement which comprises mixing all of the recycle hydrocarbon diluent, most of the conjugated diene, and a substantial portion of the compound of group (a) above to provide a first stream; mixing the remainder of the conjugated diene, the remainder of the compound of group (a) above, and all of the iodine component to provide a second stream; mixing said second stream with all of the $TiX_y$ compound to provide a third stream; mixing said first and third streams to provide a fourth stream; and introducing said fourth stream into said polymerization zone before there has been any substantial formation of polymer if any of said streams.

The present system overcomes the difficulties referred to above. The polymerization zone feed system provides improved control of the polymerization and reduces variations in cooling required in the various stages of the polymerization zone. This is probably due to the formation of a more active catalyst composition before the catalyst is introduced into the impure recycle diluent stream. The system, then, involves the formation of the active catalyst in a slipstream of the diene before mixing with the scavenged bulk of diluent and monomer feed.

Optionally, a small concentration of diluent can be present during the premixing as long as it is pure. This can be make-up diluent supplied to the system. Control of the time of premixing can be obtained by varying the amount of monomer and diluent used in this step. Make-up diluent can run in the range of 1 to 10 percent by weight of the total diluent used. Generally, 2 to 30 percent of the monomer is premixed with the iodine component, leaving 97 to 70 being supplied in the main stream. Likewise, 20 to 80 percent of the $R_nM$ or $R_2AlH$ is supplied to the premix zone, leaving 80 to 20 percent to be supplied with the main monomer and diluent stream.

The amount of the organometal compound employed in preparing the catalyst system is dependent upon the particular organometal used. When an organoaluminum compound is utilized, the mol ratio of organometal to titanium halide is generally in the range of 2:1 to 20:1, preferably in the range of 3:1 to 8:1. The mol ratio of titanium halide to iodine-containing component is usually in the range of 0.20:1 to 10:1, preferably in the range of 0.25:1 to 3:1, when using an organoaluminum compound. When an organomagnesium compound is used, the mol ratio of organometal to titanium halide is generally in the range of 0.75:1 to 3:1, and the mol ratio of titanium halide to iodine-containing component is usually in the range of 0.4:1 to 3.0:1. The concentration of total catalyst used in the present process can vary over a relatively wide range. The catalyst level is generally in the range of 1 to 20 gram millimoles of the organometal compound per 100 grams of 1,3-butadiene to be polymerized. The actual catalyst level used is, in general, determined by the Mooney value and inherent viscosity of the product which is desired.

Examples of organometal compounds suitable for use in preparing the present catalyst system include dimethylmagnesium,
diethylmagnesium, di-n-propylmagnesium,
di-tert-butylmagnesium,
di-n-hexylmagnesium,
didecylmagnesium,
di(tri-decyl)magnesium,
dieicosylmagnesium,
dicyclohexylmagnesium,
di-4-methylcyclohexylmagnesium,
dibenzylmagnesium,
di(4-phenyl-n-butyl)magnesium,
diphenylmagnesium,
di-1-naphthylmagnesium,
di-4-tolylmagnesium,
di(2,4-diethylphenyl)magnesium,
di(3,4-di-n-heptylphenyl)magnesium,
methylethylmagnesium,
methylphenylmagnesium,
butylbenzylmagnesium,
triethylaluminum,
tri-n-propylaluminum,
tri-n-butylaluminum,
triisobutylaluminum,
tri-n-heptylaluminum,
tridodecylaluminum,
trieicosylaluminum,
triphenylaluminum,
tribenzylaluminum,
tri(2-phenylethyl)aluminum,
tri(6-phenylhexyl)aluminum,
tri[6(1-naphthyl)hexyl]aluminum,
tri[9(2-naphthyl)nonyl]aluminum,
tri-2-tolylaluminum,
tri(2,4-dimethylphenyl)aluminum,
tri(3-ethylphenyl)aluminum,
tri(2,4-dimethyl-6-ethylphenyl)aluminum,
tri(4-n-butylphenyl)aluminum,
tri(2-n-hexylphenyl)aluminum,
tri(2,4,6-isobutylphenyl)aluminum,
tri(4-dodecylphenyl)aluminum,
tri(2-methyl-1-naphthyl)aluminum,
tri(2,4,5,7-tetraethyl-1-naphthyl)aluminum,
tri(4,5-dipentyl-2-naphthyl)aluminum,
tricyclohexylaluminum,
tricyclopentylaluminum,
methyldicyclohexylaluminum,
tri(4-pentadecylcycyclopentyl)aluminum,
tri(4-ethylcyclohexyl)aluminum,
tri(2,4-diethylcyclohexyl)aluminum,
tri(3-isobutylcyclohexyl)aluminum,
tri(2,4,6-tri-n-propylcyclohexyl)aluminum,
tri(2-n-propylcyclopentyl)aluminum,
tri(2-ethylcyclohexyl)aluminum,
tri(2-cyclohexylethyl)aluminum,
tri(3-cyclopentylbutyl)aluminum,
tri(14-cyclohexyltetradecyl)aluminum,
dimethylaluminum hydride,
diethylaluminum hydride,
diisobutylaluminum hydride,
didecylaluminum hydride,
dieicosylaluminum hydride,
dicyclopentylaluminum hydride,
dicyclooctylaluminum hydride,
di(3-ethylphenyl)aluminum hydride,
diphenylaluminum hydride,
propylphenylaluminum hydride,
di(3-cyclohexylpropyl)aluminum hydride,
di(4-cycloheptyldecyl)aluminum hydride,
di(3-phenylbutyl)aluminum hydride,
dibenzylaluminum hydride,
di(2,4-diphenyloctyl)aluminum hydride,
di(2-methylcyclopentyl)aluminum hydride,
di(5-nonylcyclononyl)aluminum hydride,
di(2-phenylcyclopentyl)aluminum hydride,
di(2,4-diphenylcyclooctyl)aluminum hydride,
di(2-methylphenyl)aluminum hydride,
di(2,4-dibutylphenyl)aluminum hydride,
di(2,4-diheptylphenyl)aluminum hydride,
di(4-cyclobutylphenyl)aluminum hydride,
di(2,4-dicyclopentylphenyl)aluminum hydride,
di(2,4-diisopropylphenyl)aluminum hydride, and the like.

The advantage of this invention is obtained whether a specific iodine/diene reaction step is provided for or not. The two reactants can be brought together at a temperature in the range of −100 to 250° F. The time for the reaction will depend upon the temperature, but it is usually in the range of 0.10 second to 1 hour. The reaction of the butadiene with iodine is advantageously carried out in the presence of light, such as sunlight, fluorescent light, ultraviolet light, or the like. Other conditions being equal, a longer reaction time is needed to form the 1,4-diiodo-2-butene without light. The mol ratio of 1,3-butadiene to iodine used in preparing the 1,4-diiodo-2-butene is preferably at least 1 to 1 and is generally in the range of 20:1 to 1000:1 or higher.

Instead of 1,4-diiodo-2-butene, 1,4-diiodo-2-methyl-2-butene can be utilized. It can be prepared by reacting elemental iodine with isoprene. The principles discussed hereinbefore also apply to the preparation and use of this compound. Also applicable are 1,4-diiodo-2,3-dimethyl-2-butene, and 1,4-diiodo-2-pentene.

Examples of specific catalyst systems that can be employed in the practice of the polymerization process include those that form on mixing the following components:

iodine, triisobutylaluminum, and titanium tetrachloride;
diethylmagnesium, titanium tetrachloride, and 1,4-diiodo-2-butene;
diphenylmagnesium, titanium tetrachloride, and 1,4-diiodo-2-butene;
diphenylmagnesium, titanium tetrabromide and 1,4-diiodo-2-butene;
dicyclohexylmagnesium, titanium tetrachloride and 1,4-diiodo-2-butene;
di-1-naphthylmagnesium, titanium tetrabromide and 1,4-diiodo-2-butene;
di-4-tolylmagnesium, titanium trichloride and 1,4-diiodo-2-butene;
triethylaluminum, titanium tetrachloride and 1,4-diiodo-2-butene;
tri-n-butylaluminum, titanium tetrabromide and 1,4-diiodo-2-butene;
triisobutylaluminum, titanium tetrachloride and 1,4-diiodo-2-butene;
tri-n-hexylaluminum, titanium tetrabromide and 1,4-diiodo-2-butene;
triphenylaluminum, titanium tetrachloride and 1,4-diiodo-2-butene;
tri-2-tolylaluminum, titanium trichloride and 1,4-diiodo-2-butene;
tricyclohexylaluminum, titanium tetrachloride and 1,4-diiodo-2-butene;
dimethylaluminum hydride, titanium tribromide and 1,4-diiodo-2-butene;
diisobutylaluminum hydride, titanium tetrachloride and 1,4-diiodo-2-butene;
dipropylaluminum hydride, titanium tetrachloride and 1,4-diiodo-2-butene;
diphenylaluminum hydride, titanium tetrabromide and 1,4-diiodo-2-butene;
dibenzylaluminum hydride, titanium tetrachloride and 1,4-diiodo-2-butene;
dimethylmagnesium, titanium dichloride and 1,4-diiodo-2-butene;
tri-n-propylaluminum, titanium dibromide and 1,4-diiodo-2-butene;
triethylaluminum, titanium tetrachloride, and 1,4-diiodo-2-methyl-2-butene;
triisobutylaluminum, titanium tetrachloride, and 1,4-diiodo-2-pentene; and di-n-butylaluminum hydride, titanium dichloride and 1,4-diiodo-2-butene.

The polymerization process of this invention is carried out in the presence of a diluent. Diluents suitable for use in the process are hydrocarbons which are non-detrimental to the polymerization reaction. Suitable diluents include aromatic hydrocarbons, such as benzene, toluene, the xylenes, ethylbenzene, and mixtures thereof. It is also within the scope of the invention to use straight and branched chain paraffins which contain up to and including 12 carbon atoms per molecule. Examples of suitable paraffins include propane, normal butane, normal pentane, isopentane, normal hexane, isohexane, 2,2,4-trimethylpentane (isooctane), normal decane, normal dodecane, and the like. Mixtures of these paraffinic hydrocarbons can also be employed as diluents in carrying out the process. Cycloparaffins, such as cyclohexane and methylcyclohexane, may also be used as diluents. It is usually preferred to conduct the polymerization in the presence of an aromatic hydrocarbon since polymers having a higher cis-content are produced when operating with this diluent.

The polymerization process of this invention can be conducted at temperatures varying over a relatively wide range, e.g., from −100 to 250° F. It is usually preferred to operate at a temperature in the range of −30 to 160° F. The polymerization reaction can be carried out under autogeneous pressure or at any suitable pressure sufficient to maintain the reaction mixture substantially in the liquid phase. The pressure thus depends upon the particular diluent employed and the temperature at which the polymerization is conducted. However, higher pressures can be utilized if desired, these pressures being obtained by some such suitable method as the pressurization of the reactor with a gas which is inert with respect to the polymerization reaction.

Various materials are known to be detrimental to the catalyst composition of this invention. These materials include carbon dioxide, oxygen, and water. It is usually desirable, therefore, that the butadiene be freed of these materials as well as other materials which may tend to inactivate the catalyst. In this connection, it is desirable to remove air and moisture from the reaction vessel in which the polymerization is to be conducted. Although it is preferred to carry out the polymerization under anhydrous or substantially anhydrous conditions, it is to be understood that some small amounts of these catalyst-inactivating materials can be tolerated in the reaction mixture. However, it is also to be understood that the amount of such materials which can be tolerated is insufficient to cause complete deactivation of the catalyst.

Polymer recovery is not a part of the present invention but the steps include treatment to inactivate the catalyst and recover the polymer. In one method the polymer is recovered by steam stripping the diluent from the polymer. Alternatively, an alcohol can be added to inactivate the catalyst and cause precipitation of the polymer. Additives, such as antioxidants, can be added before or after recovery of the polymer from the reaction zone effluent.

The polymers produced in accordance with this invention are rubbery polymers. The polymers can be compounded by the various methods that have been used in the past in compounding natural and synthetic rubbers. Vulcanization accelerators, vulcanizing agents, reinforcing agents, plasticizers, antioxidants, pigments and fillers such as have been employed in natural or synthetic rubbers can likewise be used in compounding the rubbers of this invention. It is also within the scope of this invention to blend the polymers with other polymeric material such as natural rubber, synthetic cis 1,4-polyisoprene, copolymers of butadiene and styrene, polyethylene, ethylene-propylene copolymers, and the like. As mentioned previously, the polymers of this invention have a very high cis-content. This property renders them very suitable for applications requiring low hysteresis, high resilience and low freeze point. In general, the products have utility in applications where natural and synthetic rubbers are used. They are particularly suitable for use in the manufacture of automobile and truck tires and other rubbery articles, such as gaskets.

The drawing illustrates a specific system adapted to carry out the process of the invention. For ease in understanding a specific system is described but, in view of the previous discussion, many alternatives are possible. This system shows the polymerization of 1,3-butadiene using toluene as the diluent and the catalyst which forms on mixing triisobutylaluminum, titanium tetrachloride and iodine.

The pieces of apparatus shown include coolers 1 and 2, premixer 3 equipped with agitator 4, and reactors 24 and 28 in series. Frequently four or more reactors in series are used but, for convenience, only two are shown. Conduit 5 supplies triisobutylaluminum. Toluene, normally that being recycled from recovery steps (not shown), is supplied by conduit 6. The major portion of the butadiene, usually 70 to 98 percent thereof, is supplied to line 6 through line 7. Around 95 percent is preferred. The toluene-butadiene mixture is cooled (preferably to 0 to 40° F.) and a substantial proportion of triisobutlyaluminum added thereto, this stream being supplied to the first stage of the polymerization system through line 23. Preferably one half of the desired triisobutylaluminum is so used but the amount can range from 20 to 80 percent thereof. Cooler 1 can be positioned downstream of the triisobutylaluminum addition if desired.

The other portion of the feed system involves the components which are premixed in premixer 3. The required components include the remainder of the butadiene supplied by line 8, the remainder of the triisobutylaluminum supplied by line 11, all of the iodine supplied by line 9, and the titanium tetrachloride supplied by line 12. Optionally some relatively pure toluene can be supplied by line 13. The resulting mixture is cooled in cooler 2 to a temperature of 0 to 40° F. and passed to mixer 3 by line 14. The titanium tetrachloride is separately supplied to premixer 3 through line 12. After the desired premixing, this stream is introduced by line 16 into line 23.

Reactors 24 and 28 are provided with agitators 26 and 29 respectively and heat exchangers 27 and 31 respectively. Conduit 32 extends from the outlet of reactor 24 to the inlet of reactor 28. Conduit 33 extends from the outlet of reactor 28.

A specific embodiment of the invention is given in the following example.

EXAMPLE

Using the system of the drawing, 1,3-butadiene was polymerized with the following overall recipe.

| | Parts by weight |
|---|---|
| 1,3-butadiene | 100 |
| Toluene | 900 |
| Triisobutylaluminum | 0.493 |
| Iodine | 0.176 |
| Titanium tetrachloride | 0.066 |

This catalyst ratio, on a mole basis, is 7.17/2/1 for the components in the order given in the recipe. A series of four reactors were used with the first reactor maintained at 50° F. and the others at 70° F. Residence time in each reactor was 30 minutes.

For this run, 4.5 percent of the gross toluene flow (fresh toluene used as diluent), 4.7 percent of the 1,3-butadiene flow, and 50 percent of gross triisobutylaluminum flow were mixed with iodine, procooled to 10 to 30° F. in cooler 2, and mixed with the titanium tetrachloride in premixer 3. Average premixer residence time was approximately 4.25 minutes. The bulk of the toluene (95.5 percent) and 1,3-butadiene (95.3 percent) were precooled to 10 to 20° F., prescavenged with 50 percent of the triisobutylaluminum, and mixed with the preformed catalyst stream in line 23. Overall conversion in the four zones was 52, 77, 88 and 91 percent. The product had a Mooney (ML–4 at 212° F.) value of 33 and a molecular configuration of 92.8 percent cis-1,4, 3.7 percent trans-1,4, and 3.5 percent vinyl addition.

Except for the fresh toluene added, all of the toluene used in this example had been previously used in the polymerization process. It was obtained from a steam stripping operation used in recovering the polymer followed by drying to less than 10 p.p.m. water in a drier column. It had the following composition.

| | |
|---|---|
| 1,3-butadiene, wt. percent | Nil |
| Butadiene dimer, wt. percent | 0.84 |
| Vinylacetylene, p.p.m. | Nil |
| Methylacetylene, p.p.m. | Nil |
| Isobutanol, p.p.m. | 74 |
| Iodine, p.p.m. (total) | 3,150 |
| Chlorine, p.p.m. (total) | <10 |
| Benzaldehyde, p.p.m. | 130 |
| Isobutyliodide, wt. percent | 0.45 |

For comparison, an essentially identical polymerization run was made in which all of the reactor feed was passed through the premixer. A total of 0.542 part by weight of triisobutylaluminum per 100 parts of 1,3-butadiene was used and the catalyst mol ratio was 7.88/2/1 triisobutylaluminum/iodine/titanium tetrachloride. The toluene and butadiene streams were mixed and cooled to 10 to 30° F., and the triisobutylaluminum and iodine added to provide a first feed stream to premixer 3. The titanium tetrachloride was separately added to the premixer. Residence time in the premixer was approximately 30 seconds. For comparative purposes, the difference in residence time of 30 seconds and 4.25 minutes is not significant in view of the much longer time in each of the subsequent reactors and the fact that the polymerization reaction takes a substantial initiation time. Reactor temperatures were 50, 70, 70 and 63 from the first to the last and overall conversion in the same order was 31, 80, 91 and 96. The product had a Mooney (ML–4 at 212° F.) value of 32 and over 90 percent cis 1,4-addition, the balance being trans and vinyl.

These two runs illustrate a principal advantage of the invention—the formation of a more active catalyst as evidenced by greater conversion in the first reaction stage, i.e. 52 percent as against 31 percent.

As many possible embodiments can be made of this invention without departing from the scope thereof, it is to be understood that all matter herein set forth is to be interpreted as illustrative and not as unduly limiting the invention.

That which is claimed is:

1. In a continuous process in which a conjugated diene containing from 4 to 5 carbon atoms is polymerized in a polymerization zone in the presence of a hydrocarbon diluent, substantially all of the diluent being recycled to the process, with a catalyst which forms on mixing (a) an organometal compound selected from the group consisting of compounds having the formula $R_nM$ and compounds having the formula $R_2AlH$, wherein R is selected from the group consisting of alkyl, cycloalkyl, aryl, and combinations of these radicals, M is selected from the group consisting of magnesium and aluminum, and $n$ is an integer equal to the valence of the metal M, (b) a titanium halide having the formula $TiX_y$, wherein X is selected from the group consisting of chlorine and bromine, and $y$ is an integer from 2 to 4, and (c) at least one component selected from the group consisting of iodine, 1,4-diiodo-2-butene and the monomethyl and the dimethyl homologs thereof, the improvement which comprises mixing all of the recycle hydrocarbon diluent, most of the conjugated diene, and a substantial portion of the compound of group (a) above to provide a first stream; mixing the remainder of the conjugated diene, the remainder of the compound of group (a) above, and all of the iodine to provide a second stream; mixing said second stream with all of the $TiX_y$ compound to provide a third stream; mixing said first and third streams to provide a fourth stream; and introducing said fourth stream with said polymerization zone before there has been any substantial formation of polymer in any of said streams.

2. In a continuous process in which a conjugated diene containing from 4 to 5 carbon atoms is polymerized in a polymerization zone in the presence of a hydrocarbon diluent, substantially all of the diluent being recycled to the process, with a catalyst which forms on mixing a compound of the formula $R_3Al$ where R is a hydrocarbon radical free of aliphatic unsaturation, a titanium tetrahalide, and iodine, the improvement which comprises mixing all of the recycle hydrocarbon diluent, most of the conjugated diene, and a substantial portion of the $R_3Al$ compound to provide a first stream; mixing the remainder of the conjugated diene, the remainder of the $R_3Al$ compound, and all of the iodine to provide a second stream; mixing said second stream with all of the titanium tetrahalide to provide a third stream; mixing said first and third streams to provide a fourth stream; and introducing said fourth stream into said polymerization zone before there has been any substantial formation of polymer in any of said streams.

3. The process of claim 2 wherein said first stream contains 70 to 98 percent of the conjugated diene and 20 to 80 percent of the $R_3Al$ compound.

4. In a continuous process in which 1,3-butadiene is polymerized in a polymerization zone in the presence of toluene, substantially all of the toluene being recycled to the process, with a catalyst which forms on mixing triisobutylaluminum, iodine and titanium tetrachloride, the improvement which comprises mixing on a weight basis all of the recycle toluene, 95 percent of the butadiene, and 50 percent of the triisobutylaluminum to produce a first stream; mixing the remainder of the butadiene, the remainder of the triisobutylaluminum, and all of the iodine to provide a second stream; mixing said second stream with all of the titanium tetrachloride to provide a third stream; mixing said first and third streams to provide a fourth stream; and introducing said fourth stream into said polymerization zone before there has been any substantial formation of polymer in any of said streams.

5. The process according to claim 2 wherein said conjugated diene is 1,3-butadiene, said compound of the formula $R_3Al$ is triisobutylaluminum and said titanium tetrahalide is titanium tetrachloride.

References Cited

UNITED STATES PATENTS

| | | | |
|---|---|---|---|
| 3,099,648 | 7/1963 | Dye | 260—94.3 |
| 3,189,592 | 6/1965 | Norwood et al. | 260—94.3 |

JOSEPH L. SCHOFER, *Primary Examiner.*

R. A. GAITHER, *Assistant Examiner.*